Dec. 26, 1967  R. C. DIMICK  3,359,796
APPARATUS FOR MEASURING MASS FLOW USING A SHIELDED PROBE
Filed Jan. 23, 1964  2 Sheets-Sheet 1
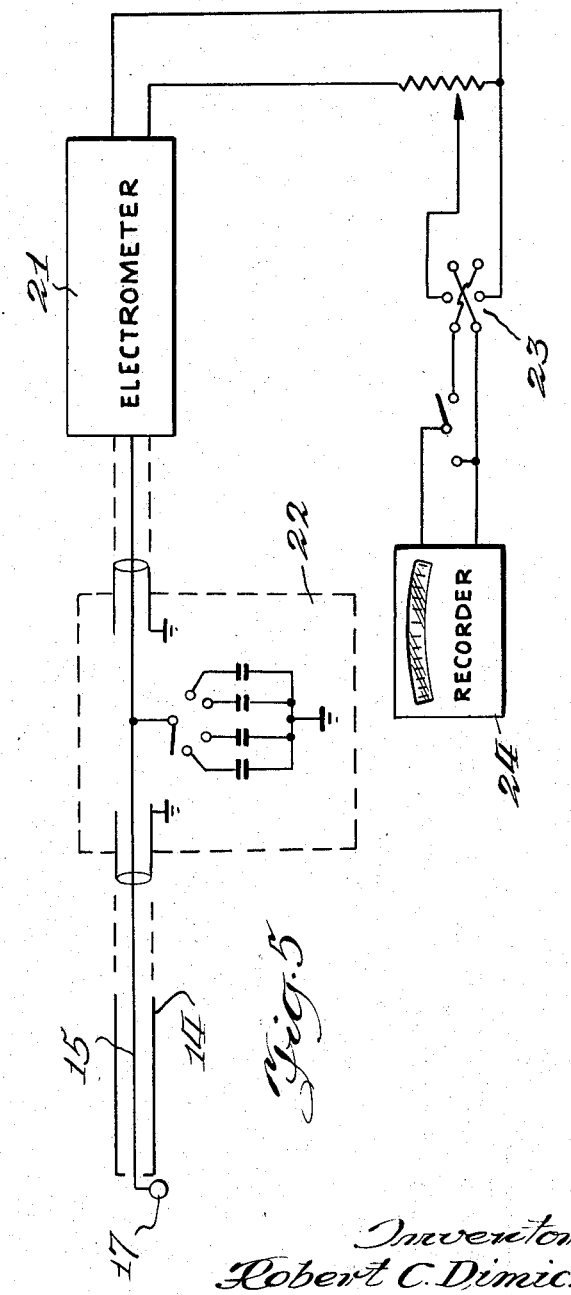
Inventor
Robert C. Dimick
By Merriam, Smith & Marshall
Attorneys

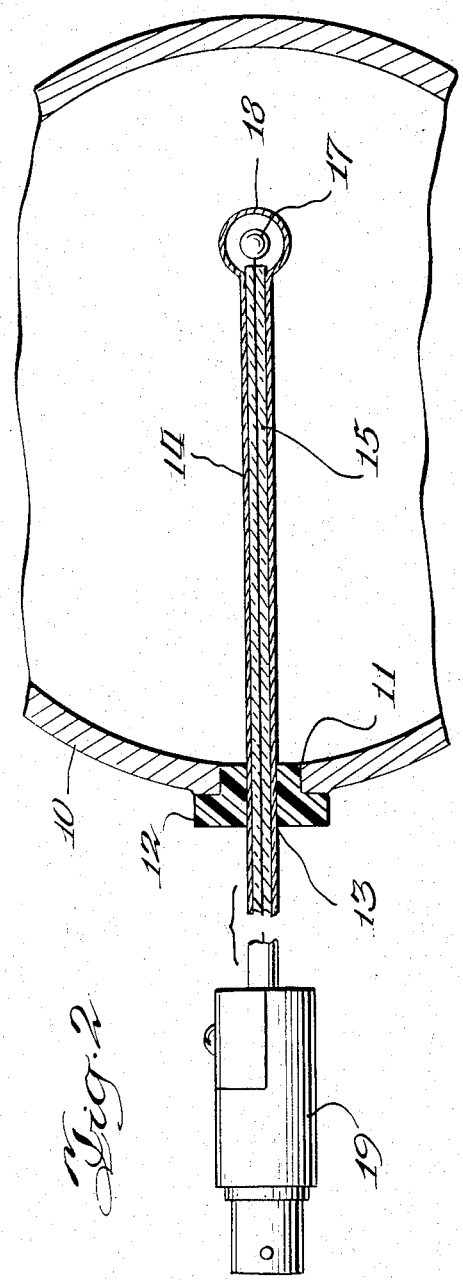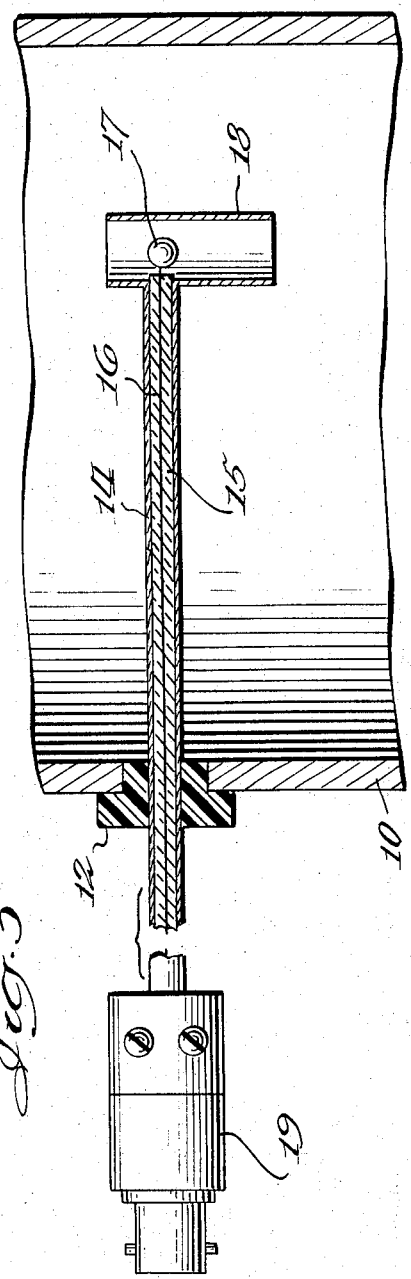

United States Patent Office 3,359,796
Patented Dec. 26, 1967

3,359,796
APPARATUS FOR MEASURING MASS FLOW
USING A SHIELDED PROBE
Robert C. Dimick, Urbana, Ill., assignor to University of
Illinois Foundation, Urbana, Ill.
Filed Jan. 23, 1964, Ser. No. 342,847
2 Claims. (Cl. 73—194)

ABSTRACT OF THE DISCLOSURE

Apparatus including a small probe inserted into the flow stream of a solid-gas suspension for measuring the mass flow of electrostatically charged solid particles in the gas. A shielded probe assembly positionable in the flow stream of a solid-gas suspension.

This invention relates generally to the measurement of the mass flow of solid particles suspended in a gas and the method and apparatus for accomplishing the same.

It has become increasingly desirious to provide some means for accurately or more definitely measuring localized mass flow in various environments. Though devices have been made available for mass flow study, there has been a need for a measuring probe capable of making instantaneous localized measurements of the mass flow in solid-gas suspensions. Further, there has been a need for a device having the ability to measure low levels of mass flow as well as the mass flow of extremely fine particles. For example, when the mass flow is so small, the flow stream appears clear when viewed with an optical mass flow probe.

My invention relates to a mass flow meter which comprises a small diameter metal ball mounted at the end of a pilot-tube shaped shaft which is inserted into the flow stream of a solid-gas suspension, the ball being connected in a suitable manner to a recording apparatus. The operation of my apparatus depends on the fact that particles carried by the gas flow in a pipe or duct system collide at intervals with the wall surface and acquire a charge due to frictional contact with the pipe wall irrespective of whether the particles or the wall materials are conductors or insulators. The amount of charge transfer per particle impact is substantially independent of velocity over the range of velocities normally used, i.e., 50 to 200 ft./sec., to transport particles in the system. Eventually, all particles of substantially the same size are charged to nearly the same magnitude and size of charge.

My mass flow meter gives the current distribution as $$i = A n_p q u_p$$

where

A is the area of the ball,
$n_p$ is the number of particles per unit volume,
$q$ is the average charge per particle,
$u_p$ is the velocity of solid particles.

Rewriting this equation gives:

$$i = A n_p m_p (q/m_p) u_p$$

or $$A \rho_p u_p (q/m_p)$$

where $m_p$ is equal to the mass of a particle,
$q/m_p$ is the average charge to mass ratio induced on the solid particles by impact with the wall,
$\rho_p$ is the particle density of the point in the flow stream where a measurement is taken.

For a narrow size range of particles, $q/m_p$ is very nearly constant and the mass flow of solid particles is given by:

$$K m_i = \rho_p u_p$$

where $Km$, the constant of proportionality, is equal to $$\frac{1}{A(q/m_p)}$$

$Km$ can be determined from the condition at the center of the pipe where it is known that $$u_o \cong u_{po} \text{ (or at least very nearly so)}$$

where $u_o$ is the velocity of air from the center of the pipe,
$u_{po}$ is the velocity of particles for the center of the pipe.

The density $\rho_p$ at the center of the pipe can be ascertained by withdrawing the particles at this point from the flow stream by means of a hypodermic instrument and weighing them or, if desired, some other conventional method may be employed.

With $\rho_{po}$, $u_{po}$ and $i_o$ being measured, $Km$ is then determined from $$Km = \frac{\rho_{po} u_{po}}{i_o}$$

The value of $Km$ may vary slightly as the meter is moved from the center of the pipe to other points in the pipe; however, the variance is so slight as not to adversely affect the mass flow measurements made at the other points.

In operation, my meter is positioned in the flow stream of a solid-gas suspension, the meter being connected to a recording device by an appropriate circuit so that the current produced as the solid particles hit the ball is amplified and recorded.

Other features and advantages are inherent in the structure claimed and disclosed, as will be apparent to those skilled in the art from the following detailed description in conjunction with the accompanying drawings, wherein:

FIGURE 1 shows a perspective view of my meter inserted in the flow stream of a pipe;
FIGURE 2 shows a sectional view of my meter as viewed along the longitudinal axis of a pipe;
FIGURE 3 shows a plan sectional view of the meter shown in FIGURE 2;
FIGURE 4 shows a fragmentary view of another embodiment of my meter; and
FIGURE 5 shows a typical embodiment of a measuring circuit used with my meter.

Referring to the drawings, FIGURE 1 shows pipe 10 which has aperture 11 located therein. The pipe can be made of any suitable material since the particles flowing within the pipe will acquire a charge regardless of the pipe material used. Located within aperture 11 is bushing 12, made of a suitable insulating material such as Teflon, and inserted within bore 13 of bushing 12 is shaft 14, preferably made of stainless steel tubing. The tight fit between shaft 14 and bore 13 allows shaft 14 to be moved as desired along the longitudinal axis of bore 13. Glass sleeve 15, which provides a high insulation resistance, is pressed into shaft 14.

Conductor 16, encompassed by sleeve 15, is soldered to metal ball 17 positioned in the flow stream of pipe 10. Cylindrical tube 18, either integrally or detachably connected to shaft 14, acts as a Faraday shield to allow my meter to be used near a charged wall surface as is the case where the duct or pipe is made from glass tubing.

When in operation, the longitudinal axis of tubing 18 is maintained parallel to the longitudinal axis of pipe 10.

The remaining end of conductor 16 is connected to block 19 of a typical measuring circuit illustrated in FIGURE 5. The current produced by impact of the particles against the ball is fed directly into an electrometer 21 which permits measurements of currents as low as $10^{-13}$ amps. Ceramic wafer switch and its associated capacitors 22 provide an adjustable damping constant to damp out rapid fluctuations in the particle density due to turbulence of the flow stream. Output from the micro-microammeter is fed through polarity reversal switch 23 into a suitable chart recorder 24 for continuous monitoring of the mass flow.

In the design of my meter, care was taken to carefully maintain a high resistance to ground by the use of glass sleeving in order that the meter has at least a $10^{11}$ ohm resistance so as not to shunt the signal picked up by ball 17. Other materials can be used for the sleeving so long as the high insulating resistance is maintained. I have determined that with my meter, having this resistance, less than one percent of the current from the ball is shunted over the normal range of mass flow measurements, i.e., currents of $10^{-7}$ to $10^{-10}$ amps., and the micro-microammeter readings can be taken as the absolute current produced by the ball with no further corrections.

Though I have disclosed a particular circuit used for recording measurements, it is appreciated that other measuring circuits could be designed by an artisan skilled in the art.

In FIGURE 4, I have shown a fragmentary view of another embodiment of my invention wherein sleeving 15 forms a right angle at its flow stream end for more securely retaining the position of conductor 16 and ball 17 in the flow stream.

In the laboratory, my meter was used for measuring the radial dependence of the mass flow of glass and magnesia particles in a horizontal cylindrical duct.

Glass particles suspended in an air stream traveling at 132 feet per second were passed through a pipe made of brass. Solid loadings of 10 and 20 pounds of glass particles were used with about 30 cubic feet of gas. The average particle size was 50 microns. The mass flow of the particles at various points from the center of the pipe was measured and plotted.

Another use for my meter is the monitoring of the mass flow in the pneumatic transport of powdered coal or powdered materials used in manufacturing processes. Further, it is of value in determining how well antistatic protection measures are working in the transport of explosive air-powdered grain mixtures in flour and feed mills. However, these uses have been set forth for illustrative purposes only and not for the purpose of limitation.

Though I have illustrated and disclosed my meter using a probe having a spherical shape, it is apparent that other geometrical probes could be employed. Moreover, other insulating materials could be incorporated in my meter aside from the Teflon used in bushing 12 and the glass in sleeve 15. Also, shaft 14 could be made of other suitable material aside from stainless steel.

The foregoing detailed description has been given for clearness of understanding only, and no unnecessary limitations should be understood therefrom, as modifications will be obvious to those skilled in the art.

What is claimed is:

1. Apparatus for measuring the mass flow of electrostatically charged solid particles in a solid-gas suspension flowing in a duct system having an aperture therein, said apparatus comprising:
   a spherically shaped conductive probe in said flow stream within said duct system;
   an elongated conductor extending through said aperture, said elongated conductor having one end connected to said spherical probe;
   an electrometer electrically coupled to the other end of said elongated conductor outside of said duct system for measuring the current produced by the impact of said particles against said probe;
   a conductive cylindrical shield tube surrounding said spherical probe in said duct system, said cylindrical shield having open ends aligned with the flow stream in said duct system for directing said flow stream to said spherical probe; and
   support means insulatably supporting said spherical probe and cylindrical shield within said duct system.

2. Apparatus as claimed in claim 1, wherein said support means includes a bushing in said aperture, an elongated rigid conducting shaft slidably disposed within said bushing and having one end connected to said cylindrical shield, and an insulating sleeve longitudinally extending within said rigid conducting shaft and insulatably supporting said elongated conductor and spherical probe, so that the spherical probe and surrounding cylindrical shield can be selectively positioned within said duct system.

References Cited

UNITED STATES PATENTS

| | | | |
|---|---|---|---|
| 2,491,445 | 12/1949 | Cunningham et al. | 73—194 |
| 2,825,872 | 3/1958 | Stubbs et al. | 324—71 |
| 3,038,118 | 6/1962 | Beckett | 324—33 |
| 3,184,967 | 5/1965 | Rogers | 73—194 |

RICHARD C. QUEISSER, *Primary Examiner.*

JAMES J. GILL, *Examiner.*

CHARLES A. RUEHL, *Assistant Examiner.*